May 8, 1951  G. J. SEARLES  2,552,463
COOLANT MEANS FOR DRILLS
Filed March 10, 1948
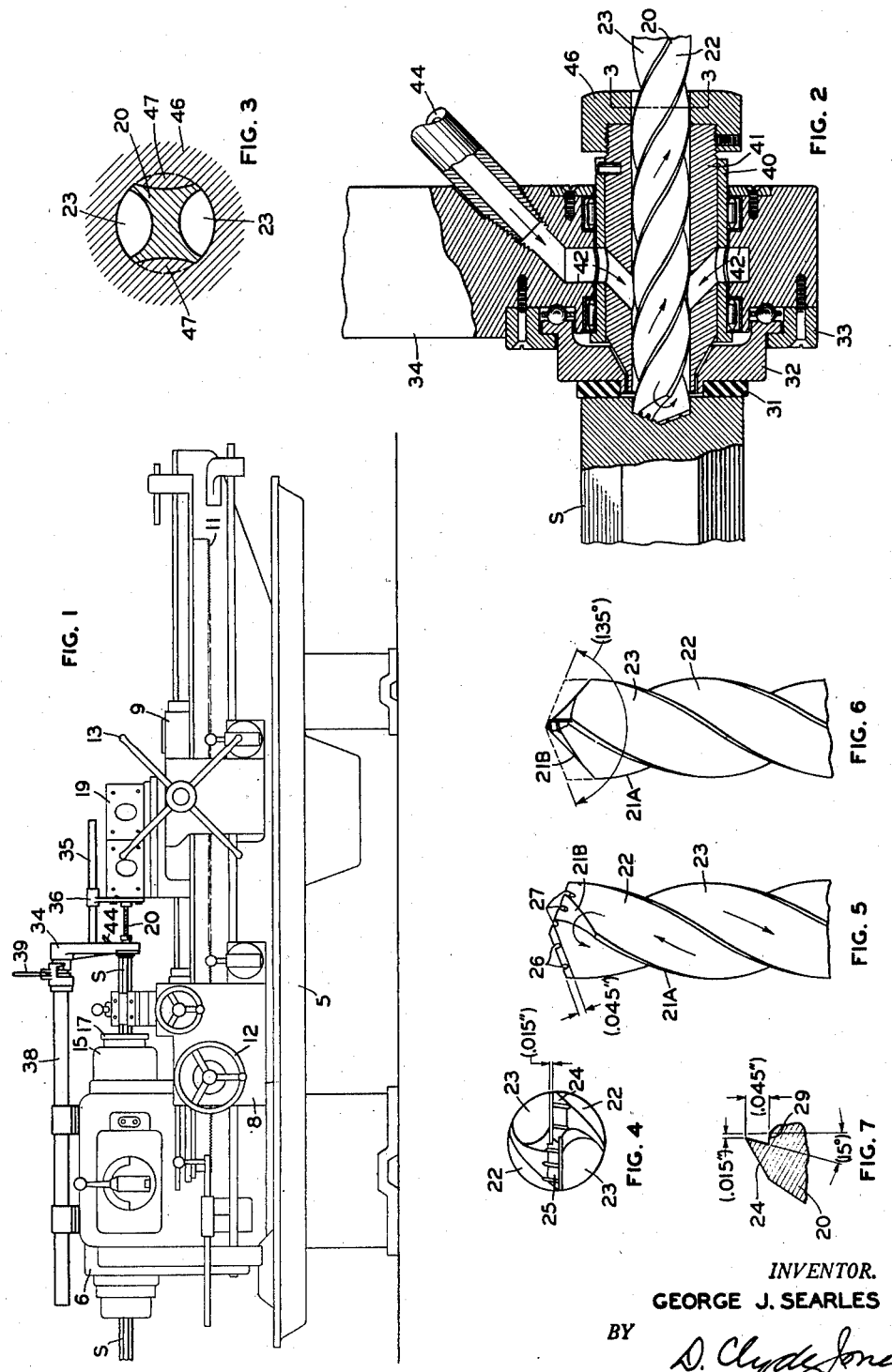
INVENTOR.
GEORGE J. SEARLES
BY
D. Clyde Jones
ATTORNEY Patented May 8, 1951

2,552,463

UNITED STATES PATENT OFFICE 2,552,463

COOLANT MEANS FOR DRILLS

George J. Searles, Rochester, N. Y., assignor to Taylor Instrument Companies, Rochester, N. Y., a corporation of New York Application March 10, 1948, Serial No. 14,066

2 Claims. (Cl. 77—68)

This invention relates to a method of and to apparatus for deep drilling in metals and similar materials. In the past where relatively deep holes have been drilled in stainless steel, carbon steel, brass and the like, it has been necessary to withdraw the drill frequently from the hole to remove the accumulated chips, otherwise the wall of the hole would be scored and in some instances the drill would be broken. In the case of stainless steel, the interruption of the drilling, when the drill was thus withdrawn for cleaning, caused the metal to harden so that the point was subjected to severe strain with resultant breakage in some instances.

In accordance with the present invention there are provided a method of and apparatus for the deep drilling of materials whereby it is unnecessary to withdraw the drill for the removal of chips even when holes of relatively great depth are being drilled.

The various features and advantages of the invention will appear from the detailed description and claims when taken with the drawings in which:

Fig. 1 is a front elevation of a conventional turret lathe having incorporated therein apparatus of the present invention by which the method of this invention can be practised;

Fig. 2 is a fragmentary view greatly enlarged, with parts thereof broken away, of the jet deflector together with the drill which is shown as having entered the stock to be drilled;

Fig. 3 is a sectional view considerably enlarged of the oil sealed retainer and drill, the section being taken substantially on the line 3—3 of Fig. 2;

Fig. 4 is an end view of the point of the drill employed in this invention;

Figs. 5 and 6 are side views of the drill taken at ninety degrees with respect to each other; and Fig. 7 is an enlarged section taken through one of the lips of the drill.

The invention can best be understood by reference to Fig. 1 wherein there is illustrated a conventional turret lathe with the apparatus of the present invention incorporated therein. This lathe is provided with the usual bed 5 on which there is supported the headstock 6, the adjustable tool post carriage 8 and the tail stock turret carriage 9. The carriage 8 and the carriage 9 are movable independently in the well-known manner, lengthwise of the bed, on the lead screw 11, under the control of the hand wheels 12 and 13.

The head stock includes a spindle housing 15 within which there is mounted a power-driven, rotatable spindle (not shown) but terminating in a collet chuck 17. This chuck, which is rotated at high speed by the spindle, tightly grips and rotates the stock S while it is being drilled. Since the tool post and its carriage 8 are not involved in the present drilling operation, it will not be referred to further.

The turret carriage 9 is provided with the conventional saddle type turret 19, in which the drill 20 of this invention is mounted so that it can be fed into the stock in the usual manner.

The body of the drill 20 is provided with a pair of opposed spiral inlet flutes 22 and with an opposed pair of discharge spiral flutes 23, one inlet flute communicating with one discharge flute. The inlet flutes 22, which serve to apply two independent streams of coolant to the point of the drill are shallower than the discharge flutes which provide two independent discharge paths for flushing the coolant and the chips from the stock being drilled. It will be noted that each margin 21A of the drill between an inlet flute 22 and its communicating discharge flute 23 is cut away as indicated at 21B so that the cross sectional area of the cut away portion is substantially equal to the cross sectional area of the inlet flute. By this construction, the coolant is not retarded in passing from flute 22 to flute 23. The cutting lips 24 and 25 of the drill are respectively provided with transverse notches 26 and 27 to function as longitudinal chip breakers, the notches 26 being radially staggered with respect to the notches 27. There is also provided in the point of the drill just at the front of each lip and in parallel relation to the cutting edge thereof, a step or chip breaker 29 which serves to break the chips transversely. Consequently, the chips are broken both longitudinally and transversely so that the resulting pieces are rectangular, with their greatest dimension approximating the space between the notches 27. Because of the relatively small size of these pieces of chips, they are easily flushed by the coolant through the spiral flutes 23 and therefore the drill, during any given drilling operation, does not need to be withdrawn from the bore in the stock for the removal of chips, even when a bore of considerable depth is being drilled in the stock.

The right hand end (Fig. 2) of the stock S being drilled, is arranged to engage snugly a synthetic rubber disk 31 carried on a rotatable seal bearing plate 32 held by a retainer 33 on the bracket 34 of a coolant jet director mechanism of the present invention. The bracket 34 is secured in a vertical position on horizontal bars 35 of which only one appears in Fig. 1. These bars, in turn, are anchored on an arm 36. The arm 36 is secured to that face of the turret 19 from which the drill 20 projects. The upper end of the bracket is latched during the drilling operation to a pilot support rod 38 by means of a manually operated cam latch 39, the support rod 38 being mounted on the head stock. As shown more fully in Fig. 2, the lower end of the bracket has rotatably mounted therein a guide bushing 40 and an oil seal bushing 41 fastened thereto. The oil seal bushing receives the drill, enabling the drill to be moved axially so that it can be advanced or withdrawn through the seal bearing plate 32 and through the rubber seal disk 31 into the stock S as it is being drilled. The seal bushing 41 has openings which always communicate both with the shallow flutes 22 in the drill and with an annular groove 42 in the bracket. A tube 44 connected to a source of coolant under pressure, supplies the coolant as a jet through the jet director mechanism and through the inlet flutes 22 to the point of the drill. An oil seal retainer 46 through which the drill can be advanced and withdrawn axially, is threaded on and also locked on the end of the oil seal bushing 41 (Fig. 2). It will be noted that the retainer 46 is provided with two convex ribs 47 (Fig. 3) respectively mating with the shallow spiral flutes 22 to prevent escape of the coolant at that point. However, the retainer allows the coolant and the chips therein to discharge through the flutes 23 and the related spaces in the retainer 46 (Fig. 3).

Briefly, the method of the present invention comprises securing in the collet 17, the stock S to be drilled. The turret 19 is rotated until the drill 20 is in alinement with the stock. Then the bracket 34 of the jet mechanism is fastened to the pilot rod 38 by the manually operated cam latch 39. The stock is now rotated at high speed by the collet in the well-known manner. The coolant is supplied under pressure to the jet mechanism while the turret carriage 9 is moved toward the left (Fig. 1) by the hand wheel 13 to bring the drill into engagement with the stock as the hole is being drilled therein. The chips cut away by the lips 24 and 25 of the drill are broken longitudinally by the notches 26 and 27 and are also broken transversely by the steps 29. When the chips are thus broken, the resulting pieces are generally rectangular or granular so that they can be readily flushed from the bore by the coolant which is supplied through the jet mechanism and the inlet flutes 22 to the point of the drill. There the coolant picks up the broken chips and flushes them out through flutes 23 and through the related spaces in the retainer 46 (Fig. 3).

The three-quarter inch drill 20, having the point angle and dimensions indicated in Figs. 4 to 7 inclusive, is particularly adapted for drilling free machining stainless steel (known in the art under the code number 303). However, the point angle, while preferably being ground to 135 degrees, may vary between 118 and 145 degrees. Furthermore, the dimensions indicated in parenthesis in the mentioned figures, while especially effective in the case of a three-quarter inch drill used for drilling the mentioned stainless steel, may be varied considerably, especially when the drill is being used to drill carbon steel, brass and the like.

What I claim is:

1. The combination with a drilling machine comprising means including a collet for gripping the stock to be drilled and for rotating the same, a drill, a support for holding said drill and for feeding it into the stock as a hole is drilled therein, said drill having a pair of passages for supplying coolant to and for discharging coolant from the point thereof, each passage including an inlet flute and a discharge flute, of a jet director mechanism, said mechanism including a rotatable oil seal bushing through which the drill passes, means in said mechanism rotatable with the stock being drilled for sealing one end of said bushing to said stock, means including said bushing for supplying coolant under pressure to said inlet flutes, a retainer engaging the other end of said bushing and through which said drill projects, means mating with said inlet flutes to substantially prevent the escape of coolant therefrom, said retainer having spaces whereby the coolant and the chips therein can flow along the discharge flutes and through the bushing for escape through said spaces.

2. The combination with a drilling machine comprising means for supporting the stock to be drilled, a drill, a support for holding said drill and for feeding it into the stock as a hole is drilled therein, means for effecting relative rotation between said stock and said drill, said drill having a pair of passages for supplying coolant to and for discharging coolant from the point thereof, each passage including an inlet flute and a discharge flute, of a jet director mechanism, said mechanism including an oil seal bushing through which the drill passes in close fitting relation, sealing means in said mechanism for sealing one end of said bushing to said stock, said sealing means being separate from said bushing enabling relative movement therebetween, means including said bushing for supplying coolant under pressure to said inlet flutes, means mating with said inlet flutes to substantially prevent the escape of coolant therefrom except at the point of said drill, said mechanism having a discharge opening whereby the coolant and the chips therein can flow along the discharge flutes and through the bushing for escape through said opening.

GEORGE J. SEARLES.

REFERENCES CITED

The following references are of record in the file of this patent:

UNITED STATES PATENTS

| Number | Name | Date |
|---|---|---|
| 552,065 | King | Dec. 24, 1895 |
| 578,431 | Tucker | Mar. 9, 1897 |
| 589,576 | Rickey | Sept. 7, 1897 |
| 1,499,584 | Litchfield | July 1, 1924 |
| 2,360,385 | Anderson | Oct. 17, 1944 |
| 2,409,525 | Andreasson | Oct. 15, 1946 |
| 2,510,203 | Andreasson | May 6, 1950 |

FOREIGN PATENTS

| Number | Country | Date |
|---|---|---|
| 452,750 | Great Britain | Aug. 28, 1936 |
| 520,213 | Great Britain | Apr. 17, 1940 |
| 714,611 | France | Nov. 17, 1931 |